July 28, 1931.  F. C. WILLIAMS ET AL  1,816,628
TRAIN STOPPING AND SPEED CONTROLLING MECHANISM
Filed April 3, 1925  9 Sheets-Sheet 1

INVENTORS
Frank C. Williams,
George H. Williams.
BY
ATTORNEY

WITNESS
H. J. Hartman.

INVENTORS
Frank C. Williams,
George H. Williams.

July 28, 1931.  F. C. WILLIAMS ET AL  1,816,628
TRAIN STOPPING AND SPEED CONTROLLING MECHANISM
Filed April 3, 1925  9 Sheets-Sheet 7

INVENTORS
Frank C. Williams,
George H. Williams.

WITNESS
F. J. Hartman.

BY
ATTORNEY

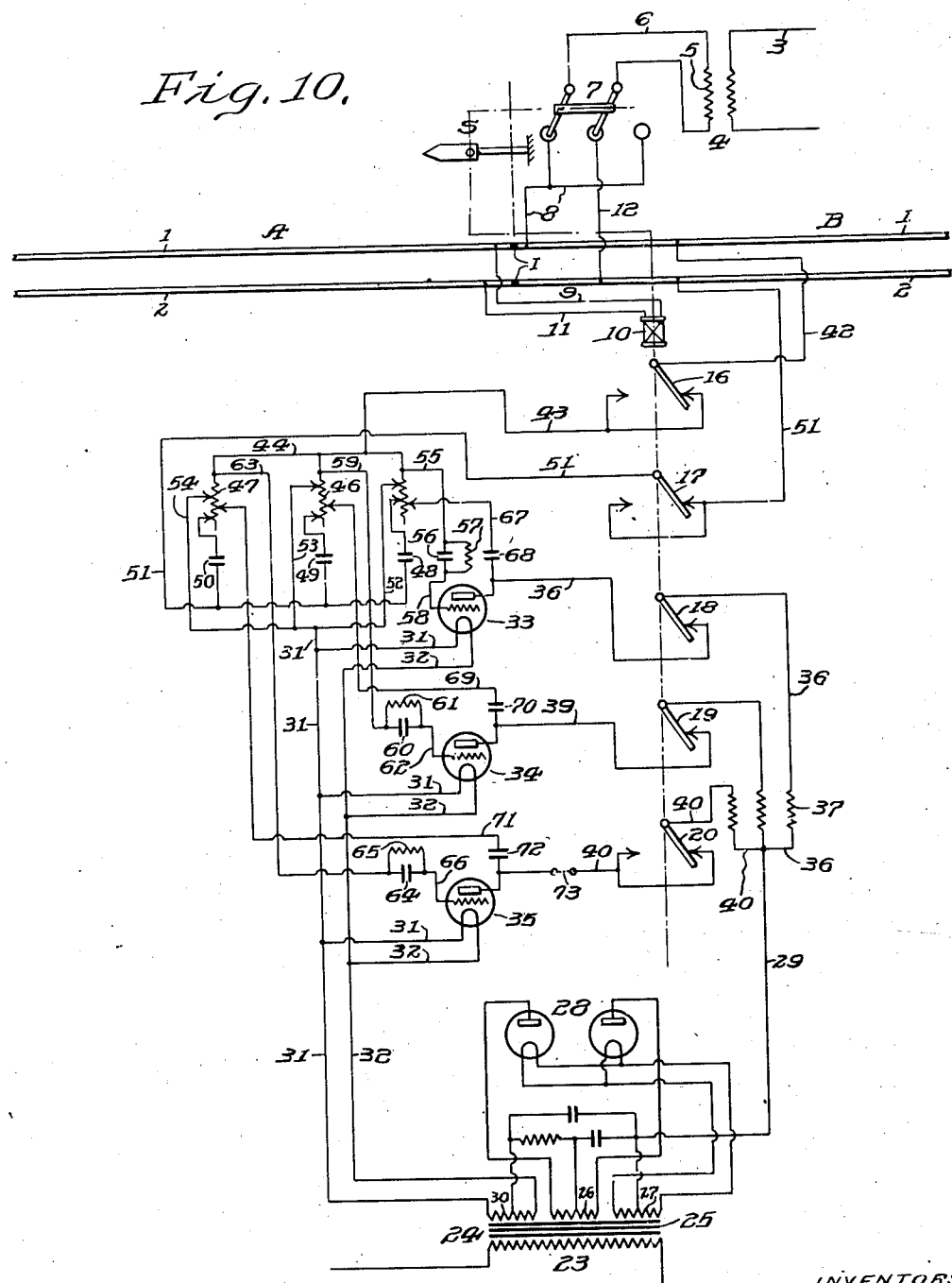

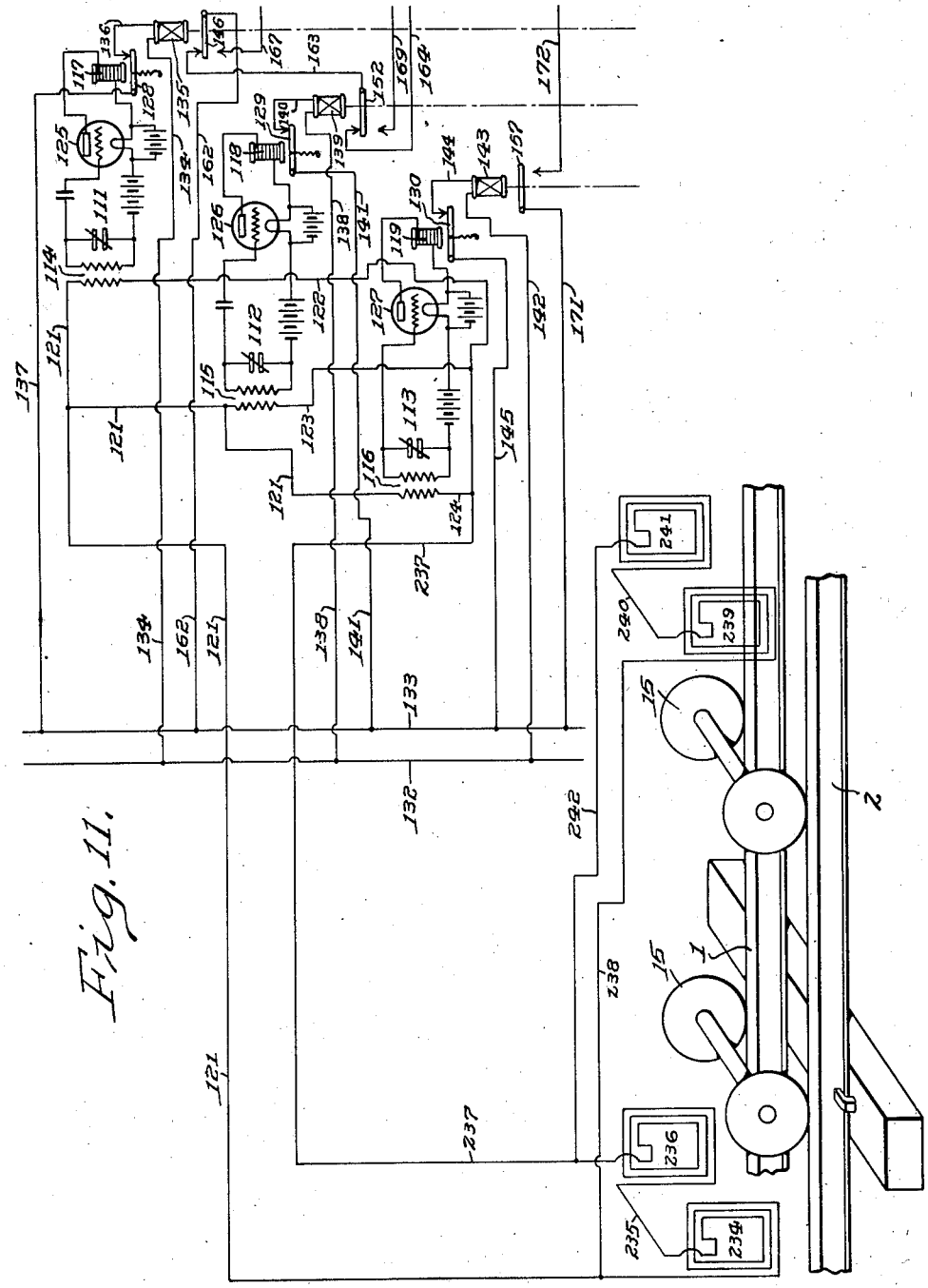

Patented July 28, 1931

1,816,628

UNITED STATES PATENT OFFICE

FRANK C. WILLIAMS, OF PHILADELPHIA, AND GEORGE H. WILLIAMS, OF HARRISBURG, PENNSYLVANIA

TRAIN STOPPING AND SPEED CONTROLLING MECHANISM

Application filed April 3, 1925. Serial No. 20,331.

Our invention relates to train stopping and speed controlling mechanisms operating automatically and independent of human interference to reduce the speed of a train to predetermined speeds whenever the engineer attempts to drive the train at a speed faster than that predetermined for the particular place under the then existing conditions as indicated by the block-signal system and will reduce the speed of the train to a "stop" or a slow speed of three or four miles per hour if the engineer attempts to pass a danger signal.

A further object of our invention is to provide a mechanism of the above character which is operated by waves of predetermined uniform frequency transmitted directly to the rails at the far or departure end of the block, the transmitter for each block being operative to control the speed of the train only when the train is in the block with which the transmitter is connected.

A further object of our invention is to provide a train with a radio receiving apparatus which will respond only to the transmitting station of the block in which the train may be.

A further object of our invention is to continuously transmit from the field transmitting station located at the departure end of each block, radio or carrier waves of at least two and preferably three distinct and different lengths, one set of said waves being continuously transmitted from said stations so long as the track is "danger" and to provide means controlled by the block signal system interrupting the transmission of one or more of these waves dependent upon the "set" of the signal for all the block in which said transmitting station is.

A further object of our invention is to control, vary and interrupt the transmission of one or more of the different kinds or lengths of waves transmitted from a broadcasting station at the end of a block, by the signal pertaining to the block.

In order to make more clear our meaning, we will state that train signal systems of the present day are automatic and operate so that the presence of a train in a particular block will throw a signal to "danger" position at the beginning of the block in which the train is and will throw the signal of the block behind that one to "caution" position and the one behind that to "clear" position. Thus, each train may be said to control three signals, namely, the one last passed by the train which is "danger"; the next behind that, which is "caution" and the next behind that, which is "safety" or "clear".

It is the object of our invention to control the transmission of waves from each station by a block signal of the block to which the transmitting station is connected so that when the signal is set to "danger" no waves will be transmitted from the transmitting station of that block to the rails of said block; when the signal is set to "caution", only two kinds of waves or waves of two different lengths are transmitted to the rails from that transmitting station, and when the signal is set to "clear" waves of three different lengths will be simultaneously transmitted from said field station; and to so connect the transmitting station to the track that the waves transmitted or broadcasted, will be received only by the receiving set of a train when the train is in the block which is controlled by that signal and to which that transmitter is connected.

A further object of our invention is to provide a train with three radio receiving sets, each tuned to respond to but one of the three kinds or lengths of waves broadcast from the field or track transmitting station, said three receiving sets being operative to display cab signal lights which may, for convenience, be termed green for "safety", yellow for "caution" and red for "danger", and also a fourth cab signal light which may be of any other selected color, as for instance blue, and which will be illuminated only when the block must be traversed at a definite predetermined reduced speed, of, for instance, twelve (12) miles an hour, as in passing through a yard or through a block in which there is a sharp curve.

A further object of our invention is to provide a train with three radio receiving sets so combined and cooperating with a speed indicator, the throttle or controller handle and the automatic brake applying mechanism as to automatically apply the brakes when a train enters a block or a section controlled by the block signal system at a speed higher than that indicated by the signal for that block, to hold the brakes applied until the speed of the train has been reduced to that predetermined rate, and to automatically release the brakes when the speed has been reduced to the proper speed so that the engineer may proceed so long as he maintains the speed predetermined for that block or under the conditions indicated by the signal.

A further object of our invention is to provide the locomotive or train or motor of a train with radio receiving sets which are responsive only to the waves transmitted by the signal next ahead of wherever a train may be and to make the sets operative to control by their successive or combined operation an automatic brake applying mechanism, a throttle controlling mechanism and a speed recording mechanism whereby the time when the speed of a train is automatically reduced or stopped is automatically recorded.

A further object of our invention is to provide an arrangement whereby if the speed indicator which cooperates with the brake applying mechanism indicates a speed higher than that corresponding to the block signal, the brakes will be applied and the speed of the train automatically reduced to the proper speed.

A further object of our invention is to provide an arrangement whereby if the speed indicator which cooperates with the train stop controlling system sticks or breaks or remains in its lowest position which would, under proper operation, correspond to "stop" position, while the signals of the track are "clear", then the control of the train is taken out of the hands of the engineer or motorman and the speed of the train is automatically reduced to stop or slowest speeds of, for instance, three miles an hour. Without such a device, with the speed indicator broken, the engineer might enter a block in which the signal is set to "danger" at high speed and continue at such speed. The object of the present invention is to absolutely remove such a possibility of danger.

A further object of our invention is to provide a train stopping mechanism wherein the speed of a train may be automatically reduced to a safety speed of say twelve miles an hour which is the speed at which a train should travel through yards or around sharp curves without affecting the signal system. In other words, the track signals may indicate that the track is clear but the train speed controlling and stopping mechanism will become operative to automatically reduce the speed of the train to twelve miles an hour through such stretches if the engineer attempts to traverse the section at a higher rate of speed.

A further object of our invention is to utilize the high tension power transmitting means of a railroad to supply alternating current at radio transmitter voltages to supply the current to transmit radio waves to one and only one block of a railroad system.

A further object of our invention is to provide the circuit of a radio receiving set in which is usually placed the telephone receiver or loud speaker with a sensitive master relay which is energized by the current in said circuit present when radio waves are being received thereover and which is substantially deenergized when no radio waves are being received thereon and to utilize such master relay to operate the automatic stopping mechanism and cab signals carried by the train.

Referring now to the drawings forming a part of this specification and in which the same reference characters are employed throughout the various views to designate the same parts, Fig. 1 is a diagrammatic view showing, in a conventional way, an automatic block signal system as applied to three complete and two incomplete blocks with the polarized relay of the block signal system arranged to operate a series of five armatures comprising the controlling mechanism of the radio transmitting station of our improved train stopping mechanism. In this figure a train T is indicated as being in block B and the position of the block signals and the signal circuits and the position of our radio transmitter control are shown in correct relative positions and relations with respect to each other.

Figure 1:
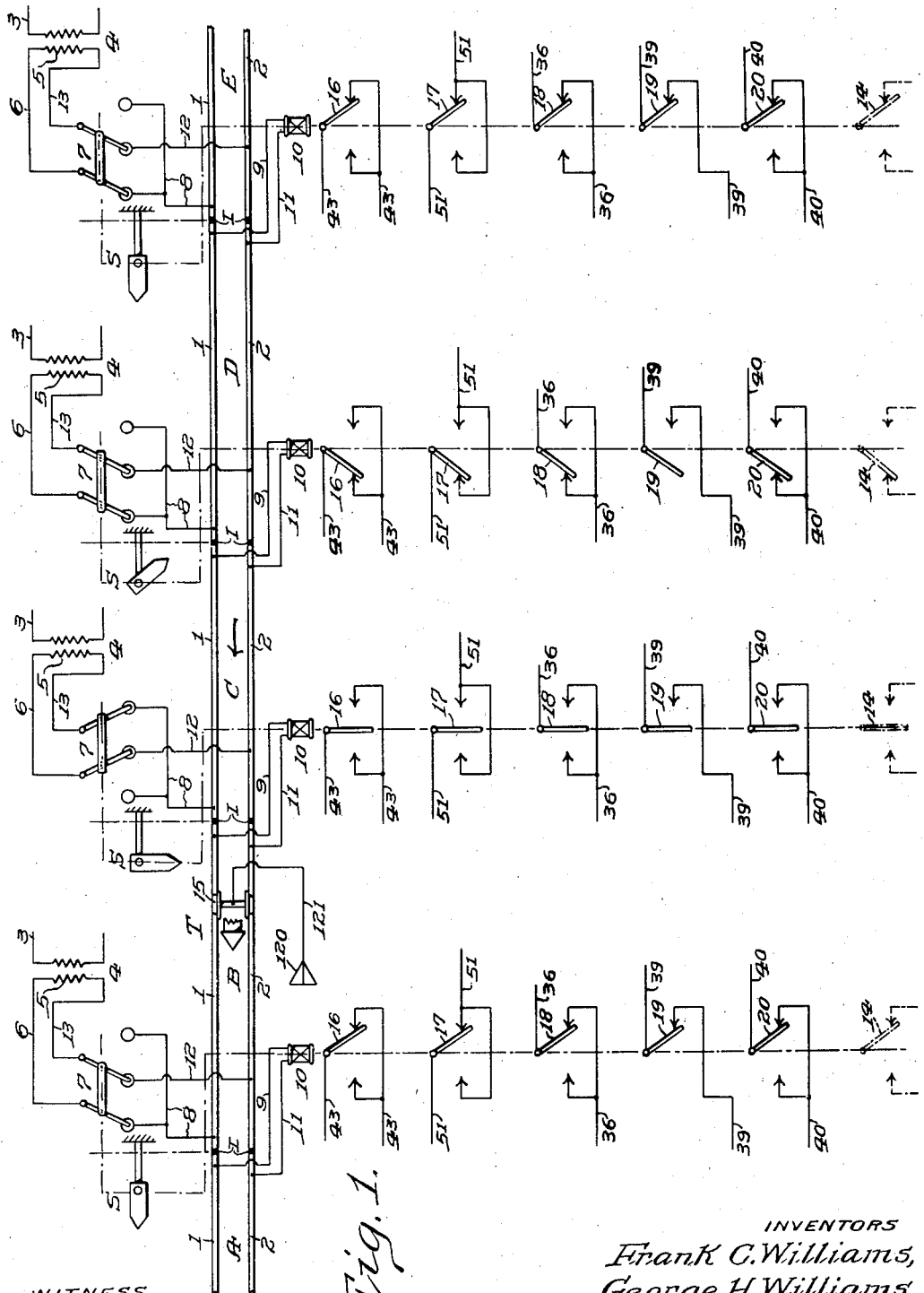

Figs. 10 and 11 are diagrammatic views of a slightly modified embodiment of our invention. Fig. 10 shows the radio transmitting station with one end of the antenna wire grounded to one rail, as in the previous construction, and the other end of the antenna connected to the opposite rail of the track. Fig. 11 shows the modified train equipment arranged to receive the oscillations impressed upon the track by the transmitting station through barrel or loop collector coils by the train immediately in front of the truck and connected to the opposite ends of the tuned receiver coils.

In referring to the track it is assumed that the track shown in the drawings is a one-way track, the trains traversing it from right to left of the figures. By the expression "beginning" of a block is meant that part of the track first traversed by a train on entering the block and by the expression "end" of a block is meant that portion last traveled by a train in leaving a block.

In general, the field equipment includes the block signal system, the radio wave transmitting station and the land electric circuits for operating the same. The train equipment includes the automatic brake applying mechanism, an automatic cab signal system, a speed indicating mechanism and a radio wave receiving apparatus tuned to and responsive only to the waves sent out from the field transmitter and the electric circuits carried by the train for operating said mechanisms and apparatus.

In order to make it clear how our train controlling mechanism operates and is operated, it is first necessary to briefly outline the manner in which the automatic block signal system of the road operates and this is diagrammatically shown in Fig. 1, wherein there is illustrated the beginning of a block A, three complete blocks B, C and D and the end of block E. Between the rails 1 and 2 of each block, there is inserted suitable insulation I.

The rails 1 and 2 of each block are preferably supplied with a low voltage two-phase alternating current which may be obtained from the high voltage power line 3 and transformer 4. The low voltage signal circuit includes the secondary coil 5, lead 6 to reversing switch 7, lead 8 to rail 1; through rail 1 to wire 9 at the beginning of the block to two-phase clockwork polarized track relay 10 of the signal S of the block signal system; thence by wire 11 through rail 2 and lead 12 to reversing switch 7 and thence by wire 13 back to primary coil 5. The connections 8 and 12 from the reversing switch are at the end of each block and the wires 9 and 11 are at the beginning of each block. When the reversing switch is in one position, such as is shown in connection with block B, the low voltage current will be sent through the rails in one direction and when the reversing switch is in the opposite position, such as is shown in connection with block C, then the low voltage signal current will be sent through the rails in the other direction. This reversing switch is operated from the adjacent signal S. The direction of the flow of current in the track rails is the same under "caution" indication of S as under "clear" indication of S and this direction may be called the normal direction. When, however, the signal S is in "danger" position, such as is indicated in connection with the end of block C, then the reversing switch 7 will be thrown to the position shown in connection with block C and the current will be fed through the rails in the direction reverse to normal. When the signal current flows through the rails in one direction, then the polarized relay 10 will throw the armature 14 of the signal system (shown in dotted lines) to the position shown in connection with the relay 10 connected to block A. When the said current flows through the rails in the opposite direction, then said armature 14 will be thrown to the limit of its movement in the opposite direction, such as is illustrated in the position shown under the relay 10 connected with the beginning of block C. When a train T enters a block, as illustrated in block B, then the trucks 15 short circuit the signal current supplied thereto from the transformer 4 and the relay 10 becomes de-energized, with the result that the armatures controlled thereby will occupy a neutral position, such as is shown in connection with the beginning of block B.

This movement of the said armatures is operative to throw the signal S to "safety", "caution" and "danger" positions, as respectively shown in connection with blocks A, C and B. Thus it is that the relay 10 controls the position of the signal S and the signal S controls the position of the reversing switch 7. Whenever the signal S is in "safety" or "caution" positions, the current supply to the rails at the end of said blocks will flow in the normal direction, but whenever the relay 10 is deenergized, then the signal S will throw the reversing switch to a position to reverse the current supplied to the block controlled by relay 10.

We employ these polarized relays 10 of the block signal system to also control the field radio wave transmitting stations by making each actuate five armatures or switches 16, 17, 18, 19 and 20. The current for the radio transmitting mechanism is preferably obtained from the high tension power transmitting line 21 which may be a 3300 volt alternating current sixty-cycle current stepped down by a transformer 22 to a 110 volt alternating current single-phase, 60 cycle current delivered to a circuit in which is the primary coil 23 of a second transformer 24, preferably provided with a laminated core 25. The transformer 24 is preferably provided with the two secondary coils 26 and 27 of a Kenstron or other standard rectifier 28 operative to supply a continuous rectified positive 40 to 60 volt current to the plate voltage bus wire 29.

The transformer 24 is also provided with a secondary coil 30 which supplies an alternating 6 volt current to the filaments of the radio-trons 33, 34, 35, through the bus wires 31 and 32 to which said tubes are connected in parallel.

From the plate voltage bus 29, we provide a lead 36 through choke coil 37 to the pivot of a two-point armature 18 operative to close the voltage line to the plate of tube 33 whenever the relay 10 is energized. Only when the relay 10 is deenergized is this plate current circuit broken.

We connect a second choke coil 38 to the busbar 29 and plate of tube 34 by a wire 39, leading to the pivot of a one point armature 19 so that the current through the wire 39 to the plate of tube 34 is broken whenever the armature 19 is in a position corresponding to "danger" or "caution" as indicated in Fig. 1.

Also connected to the bus 29 by a wire 40 is a choke coil 41, the wire 40 being connected to the pivot of the armature 20 which is a two-point armature operative to maintain a plus current to the plate of tube 35 whenever the relay 10 is energized; that is to say, continuously, except when the armature 20 is in neutral position.

Between each block is a broadcasting or transmitting antenna 42 connected by wire 43 to the pivot of the armature 16 which is a two-point armature always in contact with one of the points except when the armature 16 is in neutral position. Through this armature 16, the lead 43 is connected to a busbar 44. Connected to this busbar 44 in parallel are three variable oscillation coils or antenna inductors 45, 46, 47. One end of each coil is connected to the busbar 44 and the other end of each coil is respectively connected to one side of an antenna series condenser 48, 49, 50, the other sides of which are connected to a bus wire 51 leading to the pivot of the armature 17 which is a two-point armature maintaining the current closed therethrough at all times except when the armature 17 is in neutral position. From the armature 17, the wire 51 is connected to the end of block B, it being understood that the apparatus is positioned with respect to the track as indicated in Fig. 1 and that we are describing the system in the "safety" position to the extreme left of Fig. 1. The bus wire 31 is also adjustably connected, as shown at the coil 45 by a wire 52 and similarly by a wire 53 to the coil 46 and by the wire 54 to the coil 47. The bus wire 44 is connected by wire 55 to one side of the grid condenser 56 and with one end of a grid resistance 57 around said grid condenser, the other side of said grid condenser, and the other end of said resistance coil being connected by wire 58 to the grid of the tube 33. Similarly, a wire 59 from bus wire 44 leads to one side of a grid condenser 60 and to one end of a grid resistance coil 61, the other side of said condenser 60 and coil 61 being connected by wire 62 to the grid of tube 34. In like manner, a wire 63 connects bus 44 with one side of the grid condenser 64 and to one end of the grid resistance coil 65, the other side of said condenser 64 and coil 65 being connected by wire 66 to the grid of tube 35. The coil 45 is also adjustably and variably connected by a wire 67 with one side of a plate isolation condenser 68, the other side of said condenser being connected to the plate of tube 33. Similarly, the coil 46 is connected by wire 69 to one side of a plate isolation condenser 70, the other side of said condenser being connected to the plate of tube 34.

Likewise, the coil 47 is variably and adjustably connected by a wire 71 to one side of the plate isolation condenser 72, the other side of the said condenser being connected to the plate of tube 35.

From the foregoing, it is believed that it will be now plain that in and by virtue of the above apparatus, we have provided an arrangement whereby the oscillation coils 45, 46 and 47, which are, in fact, tuning coils, may be adjusted to oscillate at three different and distinct rates of oscillation, each of which will be transmitted to the antenna 42 and will be broadcasted therefrom. So long as the signal S is in "safety" position, all three sets of radio waves will be continuously broadcasted from the antenna 42.

Figure 2:
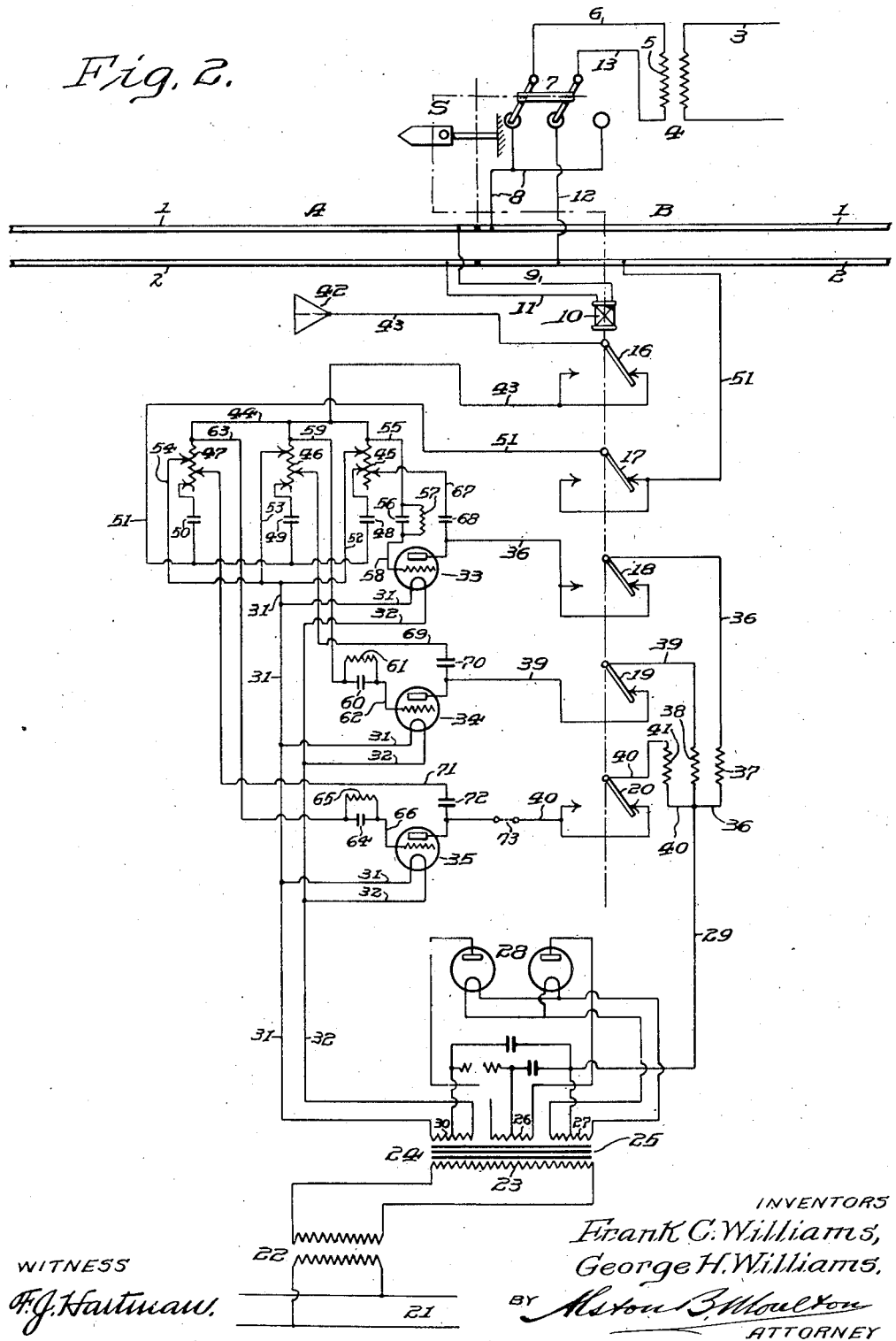
Fig. 2 is a diagrammatic view of the radio transmitting station between blocks A and B of Fig. 1, the position of the signal S at the end of block B being "clear" or "safety".

Our system is such that a train, whether steam or electric, may be equipped with an apparatus to be later described in detail, wherein are three radio receiving sets, each in attune with one of the three kinds of waves transmitted from the antenna 42 and operative so long as the three kinds of vibrations are being transmitted, to permit of the normal operation of the train up to any speed at which the engineer or motorman desires to propel the train. In Fig. 2 is clearly illustrated the various positions of the parts controlled by the polarized relay 10, so long as the block A to which the relay 10 is connected is clear.

Figure 3:
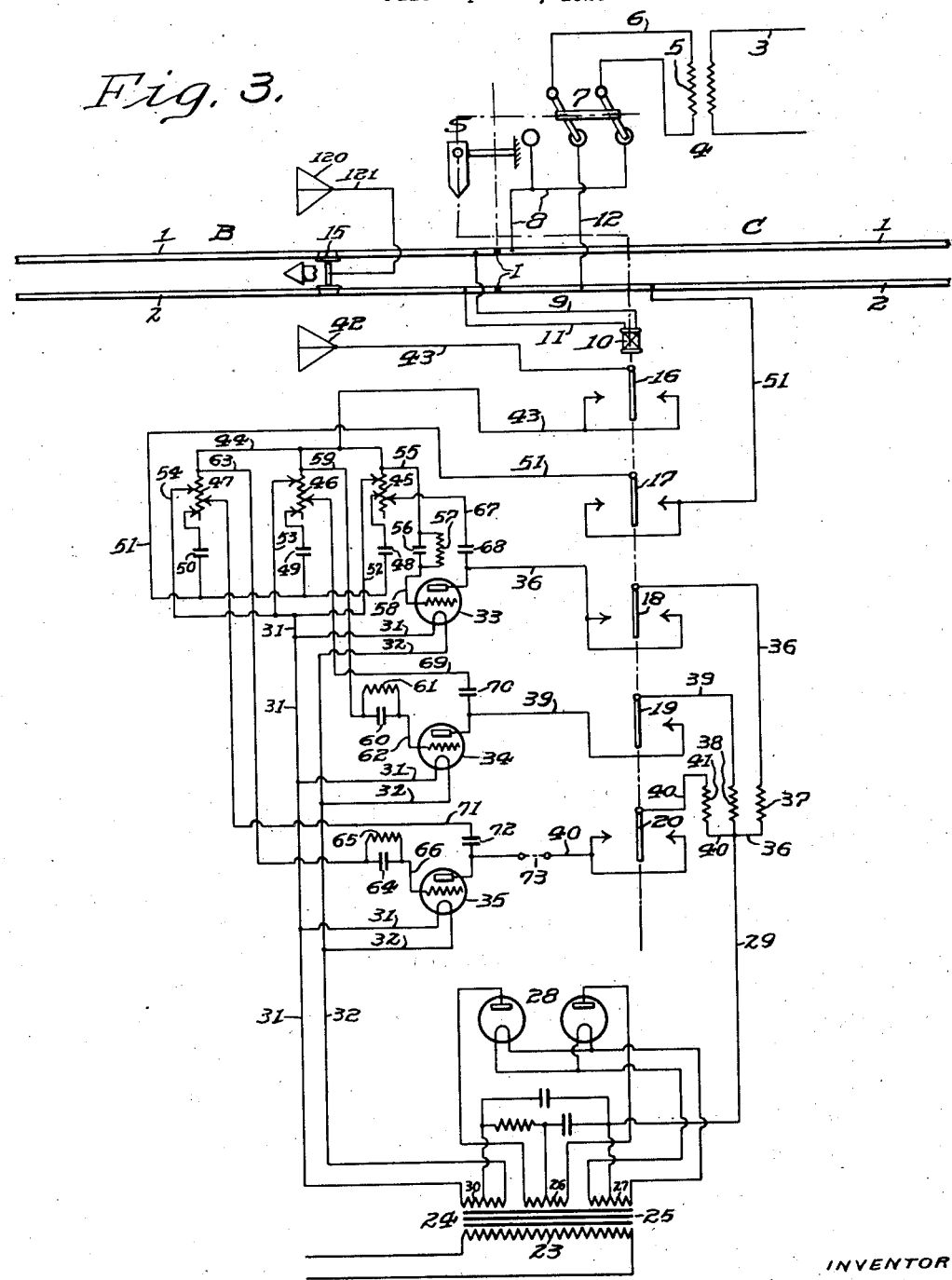
Fig. 3 is a similar diagrammatic view of the transmitting station between blocks B and C corresponding to the position shown in Fig. 1. The signal S has been thrown to "danger" position due to the presence of a train in block B.

Now referring to Fig. 3 wherein a train is represented as being in block B and referring to the set of signals between blocks B and C of Fig. 1 and as more particularly illustrated in Fig. 3, the presence of the train T in block B short circuits the polarized relay 10 with the result that the armatures 16, 17, 18, 19 and 20 are in neutral position, all of the circuits controlled thereby being broken. The armature 16 breaks the lead 43 leading to antenna 42. The armature 17 breaks the connection to the rail 2. The armatures 18, 19 and 20 break the positive current supply from the bus 29 so that no current is supplied to the plates of the tubes 33, 34 and 35. Of course, in this position, no oscillations of any kind are transmitted from the transmitting station and no radio oscillations will be received therefrom by the receiving apparatus of the train. Under these conditions our train control and stopping mechanism to be later described are so arranged and operated to apply the brakes and stop the train or what is preferable, reduce the speed of the train to a very low speed not preferably above three miles an hour, enabling the engineer to proceed at a very slow speed but operative to absolutely stop the train if the engineer attempts to proceed at a rate of speed higher than three miles an hour. This operation will be described below in connection with the receiving set carried by the train and the mechanism operated thereby.

Figure 4:
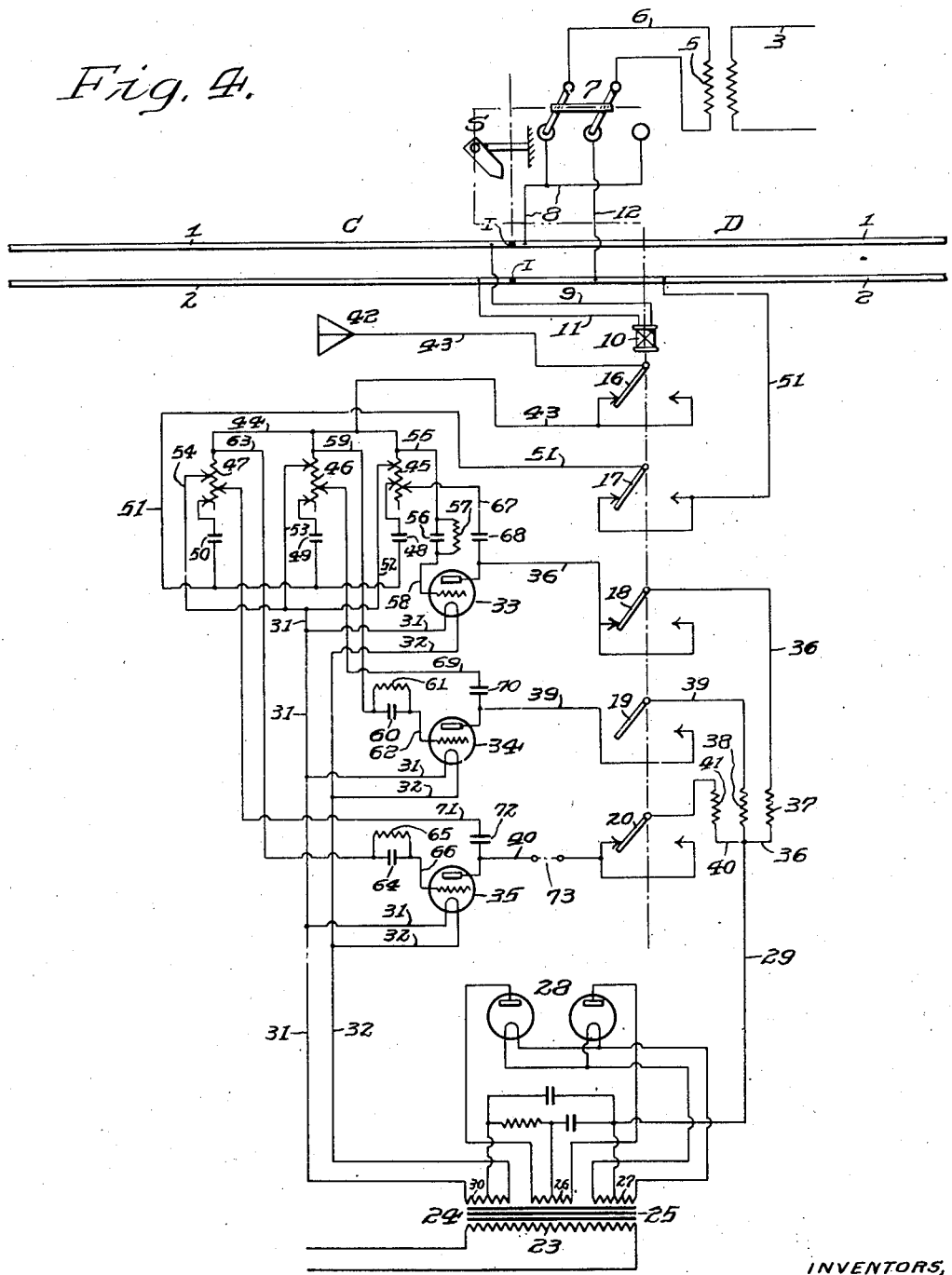
Fig. 4 is a similar diagrammatic view of the transmitting station between blocks C and D of Fig. 1, the signal of this station being set to "caution".

In Fig. 4 is shown the position of the various parts of the transmitting apparatus corresponding to the third position from the left of Fig. 1, that is to say, the "caution" position. The signal S between blocks C and D has been thrown to "caution" position by the block signal system as heretofore described and in so doing it will operate the reversing switch 7, and the polarized relay 10 will be energized in a direction opposite to its normal direction, swinging the armatures 16, 17, 18, 19 and 20 to the left. In this position, the armature 16 throws the antenna 42 into electrical connection with the busbar 44 and the armature 17 closes the antenna circuit below the condensers 48, 49 and 50 through wire 51 to the rail 2. The armature 18 will close the plate circuit to the plate of the power tube 33, the armature 20 will close the plate circuit to the plate of power tube 35, but the armature 19 will break the plate circuit to the plate of tube 34. The result of this operation will be that oscillations corresponding to the oscillation coils 45 and 47 will continue to broadcast from the antenna 42 but no oscillations corresponding to the coil 46 will be transmitted to the antenna 42. The receiving apparatus on the train, to be later described, is so arranged that under these conditions the engineer may proceed at a reduced rate of speed corresponding to "caution" speed and which may be, for instance, 15 or 20 miles an hour but operative, if the engineer undertakes to exceed that speed, to take the control of the train out of his hands and reduce the speed of the train to that predetermined "caution" speed.

There is one further feature of construction which should be here referred to. There are certain places or stretches in all railroads where the engineer should drive his train at a relatively slow speed of, for instance, twelve miles an hour. These conditions would apply to sharp curves or through the yards of a railway station. If the railway signals show the track to be in a clear condition, the engineer might be tempted to exceed the limit placed upon such stretches of track. In the wire 40 leading to the power tube 35, we may place a cut-out 73 which may be a switch of any suitable kind which can be locked in circuit breaking position by the track engineer. The result of this would be that for the block which should not be traversed at a speed higher than twelve miles an hour, oscillations from the coil 47 would not be transmitted to the antenna 42. Two kinds of waves corresponding to the coils 45 and 46 would be the only ones transmitted from antenna 42. To meet these conditions, we have provided an arrangement whereby the receipt on the receiving station carried by the train of waves corresponding only to coils 45 and 46 will be operative to reduce the speed of the train to yard speeds of say twelve miles an hour, if the train on entering the block so protected is proceeding at a higher rate of speed. The foregoing constitutes a full disclosure of the apparatus for transmitting radio waves for each block of the track, the end of each block being provided with a broadcasting or transmitting antenna which controls directly only the block at the end of which it is positioned. That is to say, the radio waves transmitted from the antenna 42 shown in Fig. 2 will be received only by a train in block B and referring to Fig. 3 the waves sent out by antenna 42 will be received only by a train in block D and so throughout the entire length of the track. This is because the antenna 42 is normally grounded directly to the insulated rail 2 and because the antenna of the train, to be later described, is also grounded to the same insulated rail, as will be more apparent when the receiving apparatus is described below.

Figure 5:
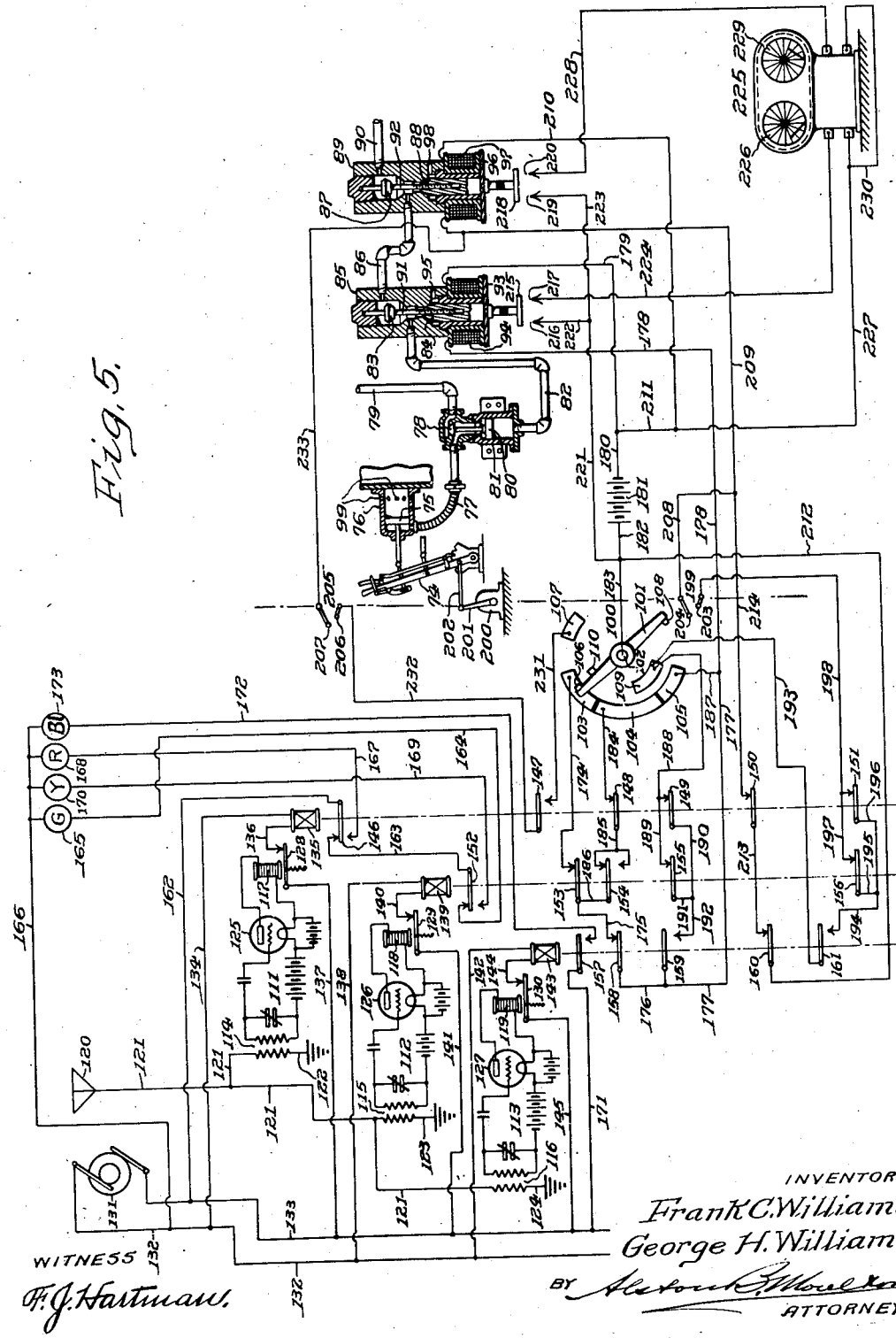
Fig. 5 is a diagrammatic view of our improved cab signal and train stopping mechanism, all controlled by three radio receiving sets each attuned respectively to one of the three radio transfer apparatuses of the track or field system. The parts are shown in the high speed "clear" track condition; that is to say, with the train running at high speed over a block controlled by a "clear" signal.

Referring now to Fig. 5, we have shown a throttle or controlling lever 74 having connected thereto a piston 75 in a cylinder 76 for the automatic closure of the throttle. An air pressure pipe 77 connects the rear end of the cylinder 76 with the upper end of a valve 78 which normally prevents the passage of compressed air from the air brake pipe 79 to the cylinder 76, said valve 78 being kept normally closed by a piston 80 in a cylinder 81, the lower part of which communicates by a pipe 82 with a chamber underneath the seat of an upper valve 83 and above a lower valve 84 in a valve casing 85. Preferably, the upper part of the valve casing 85 above the valve 83 communicates by a pipe 86 with the chamber beneath the seat of an upper valve 87 and above a lower valve 88 in a valve casing 89 similar to the valve casing 85. The upper part of the valve casing 89 communicates by a pipe 90 with a suitable source of air supplied under pressure. The upper valve 83 is connected to the lower valve 84 in the casing 85 by a rigid stem 91 so that both valves move vertically in unison. The upper valve 87 is connected to the lower valve 88 in the casing 89 by a stem 92. The lower valve member 84 is preferably rigidly connected with an armature 93 of electromagnet 94 so that when the magnet 94 is deenergized and the armature 93 falls, the lower valve 84 falls from its seat and the upper valve 83 falling with it comes to rest on its seat to cut off communication between the pipe 86 and the pipe 82, whereupon air contained in the cylinder 81 may now flow backward and out of the vent 95 in the seat of the casing 85. Similarly, the lower valve 88 is rigidly connected with an armature 96 which is normally upheld by an electromagnet 97. When, however, the electromagnet 97 is deenergized, the valves 87 and 88 fall, the upper valve 87 cutting off communication between the pressure pipe 90 and the pipe 86 and the lower valve 88 putting the pipe 86 into communication with the vent 98 in the valve casing 89. The falling of either armature 93 or 96 permitting the air to escape from cylinder 81 releases the valve 78 and permits air pressure to flow through the pipe 79, valve 78, pipe 77 to cylinder 76 to release the throttle lever and close the throttle. It is to be understood that when the throttle has been closed and the piston 75 has passed the openings 99 in the cylinder 76, the continued flow of air from the air brake pipe 79 to the atmosphere will reduce the pressure to apply the brakes to the car wheels in the usual manner. When, however, for any reason, after having been deenergized, the electromagnet 97 is reenergized, then the valve controlled thereby will be raised and the valve 78 will be automatically closed and the engineer is free to then open his throttle to proceed in accordance with track conditions. In this case we prefer to so arrange the armatures 93 and 96 that they do not fall out of the field of their respective electromagnets 94 and 97 so that when the electromagnets are re-energized they will automatically lift their respective armatures. Also carried as a part of the engine or motor equipment, is a speed indicator 100 which may be of any well known and approved construction, wherein a contacting arm 101 swings on its pivot 102 to various positions dependent upon the speed of the train. One end of the arm 101 is adapted to swing over and consecutively make contact with a series of three metal segments 103, 104 and 105, each insulated from the other and arranged in an arc. Preferably, the arm 101 has a brush 106 which consecutively sweeps over the segments 103, 104 and 105 as the speed of the train varies. Diametrically opposite the segment 105 is another short segment 107 with which the brush 108 on the other side of the contact arm 101 is adapted to contact when the arm 101 swings through an appropriate arc. Between the pivot 102 and the segments 104 and 105, is a fifth metal segment 109 with which the brush 110 is adapted to cooperate under certain conditions, all of which will be explained below. The position of the arm 101 with respect to the various arcuate contact plates above referred to will control the electric circuits leading to the electromagnets 94 and 97 to admit or check the flow of air to the cylinder 81.

Carried by the train are three radio receiving sets 111, 112 and 113 each having respectively a tuning coil 114, 115 and 116 respectively tuned to one of the three wave lengths sent out from the transmitting antenna 42. Thus, the set 111 will respond only to the wave lengths sent out by the transmitting set containing the armature 18, the power tube 33 and the coil 45; the receiving set responding to the transmitting set containing the armature 19 of the power tube 34 and the oscillation coil 46; while the receiving set 113 responds only to the vibrations sent out by the transmitting set including the armature 20, the power tube 35 and the oscillation coil 47. The receiving sets 111, 112 and 113 may be of any approved type, that being illustrated in Fig. 5 of a standard well-known type, excepting that electromagnets 117, 118 and 119 are included in the plate circuits respectively of the radio receiving sets 111, 112 and 113, so that so long as the tuned receiving coils 114, 115 and 116 are receiving vibrations a greater current will flow through the electromagnets 117, 118 and 119 than when the tune receiving coil is not receiving oscillations. It should be here stated that the train or locomotive or motor is provided with a receiving antenna 120, having a wire 121 which is connected respectively to one end of the tuned receiving coils 114, 115 and 116, the other ends of said coils being respectively grounded to the engine and consequently to the tracks by wires 122, 123, 124. Oscillations received by the tuned coils 114, 115 and 116 are conducted to the grids of the receiving tubes 125, 126, 127 to increase the current flowing from the plates of said tubes to the filaments so that when the coils 114, 115 and 116 are receiving oscillations in what would be the audion circuit, the current will be sufficient to keep energized the electromagnets 117, 118, 119, but when, for any reason oscillations are not being sent out from the transmitting station and consequently are not being received on one of the receiving sets, then the current through the electromagnets will be so weakened as to permit the armatures thereof to fall. These electromagnets are in reality master magnets. They are delicate and are provided respectively with armatures 128, 129, 130 to control the electric circuits to be hereinafter more specifically described.

The relays or magnets 117, 118 and 119 are provided with shade rings, which provide enough residual magnetism to prevent a slight decrease in the amount of current flowing through the magnets from producing a release of the armatures cooperating therewith and to insure the retention of the armatures against the electromagnets cooperating therewith, notwithstanding the vibration to which they are continuously subjected due to the motion of the train. Also carried by the train as a part of the equipment, is an alternating generator 131 to produce a single-phase 110 volt, 25 cycle alternating current. The current from this generator 131 is conducted to two bus-wires 132, 133. The master electromagnet 117 controls a circuit from bus-wire 132, comprising wire 134, relay 135, wire 136, armature 128 and wire 137 back to bus-wire 133. The armature 129 of the receiving set 112 controls a circuit from bus-wire 132, through wire 138 to magnet 139, wire 140, armature 129 and wire 141 back to bus-wire 133. The armature 130 of the receiving set 113 controls a circuit including bus-wire 132, wire 142, relay 143, wire 144, armature 130 and wire 145 back to bus-wire 133. Whenever then any one of the master armatures 128, 129 and 130 falls by reason of an interruption in the receipt of radio waves to which its coil is attuned, then the corresponding relay or magnet 135, 139 or 143 controlled thereby will become deenergized permitting the armatures controlled thereby and to be hereinafter described, to drop to their lowest positions.

The coil 135 controls six armatures, namely, 146, 147, 148, 149, 150 and 151 and retains said armatures in their uppermost positions so long as the magnet 135 is energized. The coil 139 controls five armatures, namely, 152, 153, 154, 155, 156, and so long as the coil 139 is energized, the armatures controlled thereby are held in their uppermost positions.

The coil 143 also controls five armatures, namely, 157, 158, 159, 160, 161 and maintains them in their uppermost positions so long as said coil 143 is energized.

Referring further to Fig. 5, from bus-wire 133, a wire 162 leads to the pivot of armature 146. This armature constitutes a part of a two-point relay and from the upper point thereof a wire 163 leads to the pivot of armature 152 which is also a part of a two-point relay. From the upper point of this latter relay, a wire 164 leads to the green light 165 and thence to bus-wire 166 and back to the bus-wire 132.

From the lower contact point of the two-point relay controlled by armature 146, a wire 167 leads to the red light 168 and thence to the wire 166 and back to bus-wire 132. From the lower contact point of the two-point relay controlled by armature 152, a wire 169 leads to the yellow light 170 and thence to the wire 166 and back to bus-wire 132. From bus-wire 133, a wire 171 runs to the pivot of armature 157 which cooperates with a lower contact point connected by wire 172 to the white light 173 which is in turn connected to wire 166 back to bus-wire 132.

Figure 6:
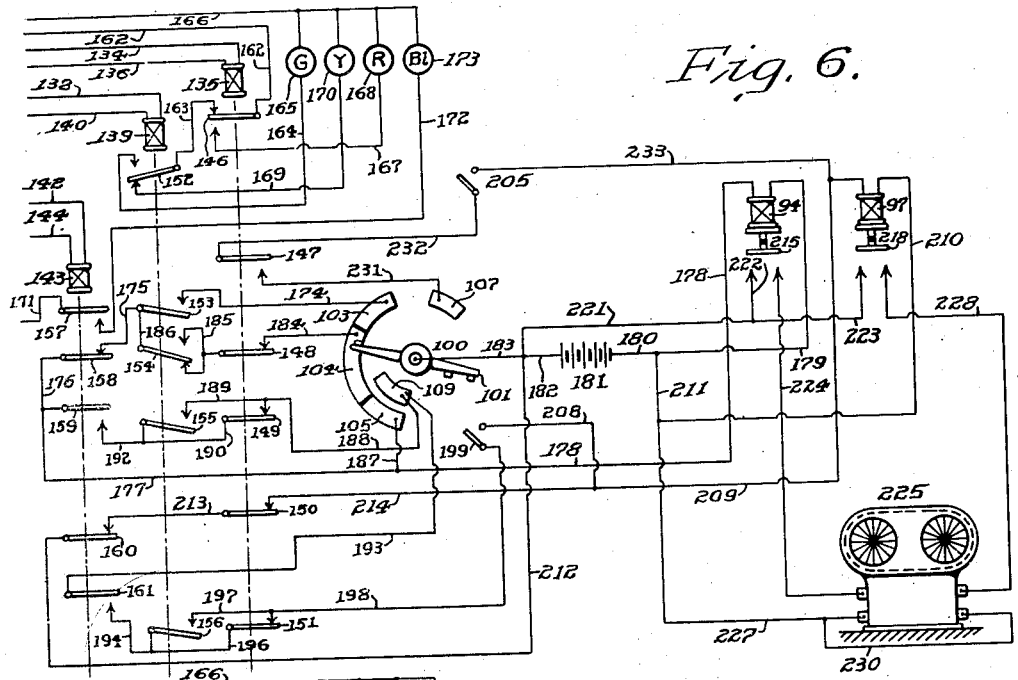
Fig. 6 is a diagrammatic view of the master relays of the three radio receiving sets of the train equipment and the positions of the parts in a block in which the track signal is set to "caution" and the train is proceeding at a speed not higher than a predetermined "caution" speed.

It will now be apparent that when the radio waves of three different lengths are being simultaneously received by the three radio receiving sets 111, 112 and 113 and the armatures thereof, 146, 152 and 157, are held in their highest positions, the only cab signal light circuit which will be completed or closed will be that to the green light 165, indicating to the engineer that the block in which the train is located, is clear. This position is clearly shown in Fig. 5. When the signals for a block are in the "caution" position, such as is shown in Fig. 4, the only radio waves sent out by the transmitter antenna 42 are those from coils 45 and 47. The current through the tube 34 and coil 46 of the transmitter station is broken. Under these conditions, coil 135 will be energized to hold its armature 146 in its uppermost position and coil 143 will be energized to hold its armature 157 in uppermost position. Coil 139, however, will be deenergized and its armature 142 will fall to the lower contact point. This condition is shown in Fig. 6. The falling of armature 152 breaks the circuit comprising wire 162, armature 146, wire 163 to upper point and wire 164 to the green light and closes the circuit comprising wire 162, armature 146, wire 163, armature 152 and wire 169 to yellow light 180, back to wire 166 and bus-wire 132, displaying a yellow light in the cab, which constitutes a "caution"

signal corresponding to the 45° position of the semaphore S. The current through red light 168 will be broken by armature 146 and that through the white light will remain broken by armature 157. Thus a "caution" signal will be displayed in the cab whenever a train enters a block in which the track signal is set to the "caution" position.

Figure 7:
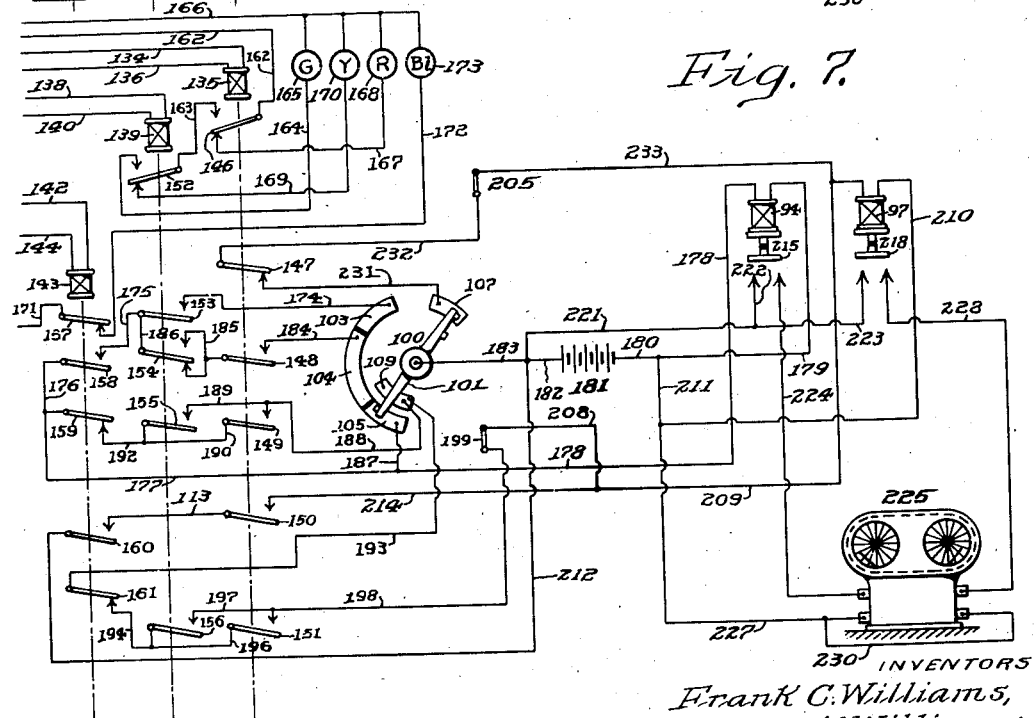
Fig. 7 is a view similar to Fig. 6 but with the parts in a position corresponding to "danger" and in which the engineer or motorman may proceed slowly at a low speed of say three miles an hour.

When the track signal is in "danger" position, as shown in Fig. 3, the relay 10 is short-circuited and deenergized and all the circuits leading to the radio transmitting sets will be broken, with the result that no waves are sent out from the antenna 42. No radio waves will be received then by the radio receiving sets on the train and the electromagnets 135, 139 and 143 will all be deenergized, permitting the armatures normally held up thereby to fall to their lowest positions. This position is shown in Fig. 7. The circuit through the green light 165 will be broken by armature 152. The circuit to the yellow light 170 will be broken by armature 146. The circuit through the red light, however, from wire 162, armature 146, wire 167, through red light 168 to wire 166 to bus-wire 132 will be closed and a red light will be displayed in the cab.

Figure 8:
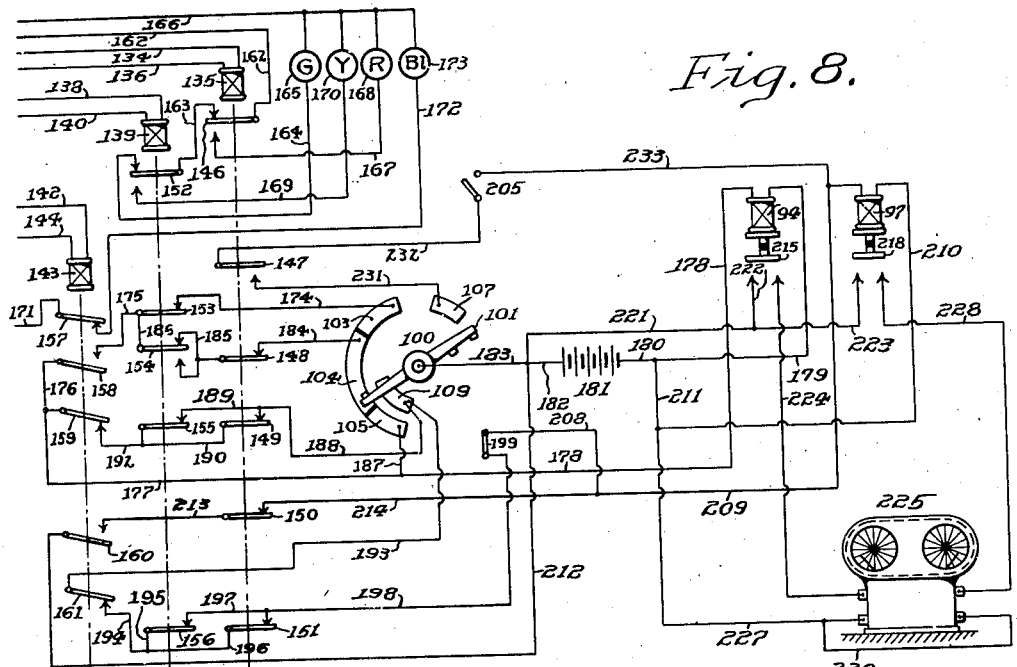
Fig. 8 is a diagrammatic view similar to Figs. 6 and 7 but showing the parts in the position corresponding to a yard or sharp curve speed of say twelve miles an hour with the train moving at or under said predetermined speed of twelve miles an hour.
Figure 9:
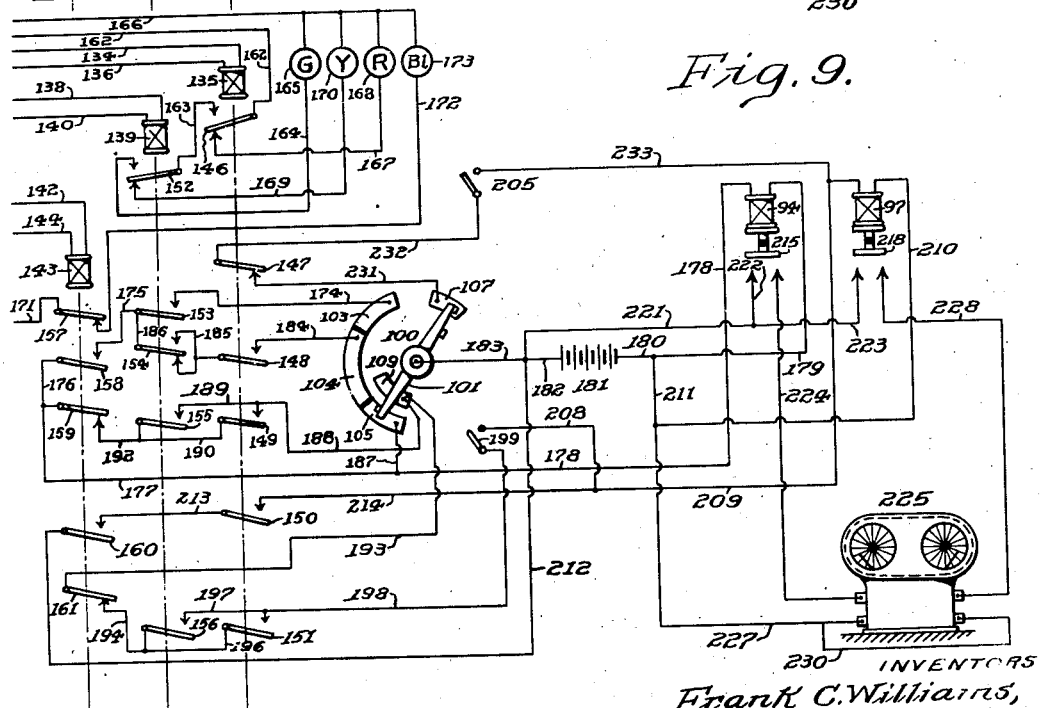
Fig. 9 is a view similar to Figs. 6 to 8 inclusive but showing how the control of the train is taken completely out of the engineer's hands when the speed indicator needle sticks or is broken and stays at its lower position in which condition, were it not for the switches operated by the throttle, the engineer might proceed at any speed irrespective of the condition of the track signals.

In the arrangement here shown and described, the deenergizing of the magnet 143 and the falling of its armature 157 will also close a circuit through wire 171, armature 157, wire 172, blue light 173 to wire 166, back to bus-wire 132 and the blue light 173 will be illuminated simultaneously with the red light 168. This, however, is unimportant; the circuit through the blue light might be broken under these conditions by some other means, but in order to keep the construction as simple as possible, we have not shown the circuit through the blue light as broken when under "danger" conditions. When there is a stretch of track which should not be traversed at a speed higher than yard speeds, as for instance, twelve miles an hour, the circuit in the transmitting station leading to the plate of the tube 35 will be broken by opening the switch at 73, and, therefore, although the signal may be set for "clear", no waves will be transmitted corresponding to the set comprising tube 35 and coil 47. The condition of the train receiving set under these conditions is shown in Fig. 8 wherein the magnet 143 of the set 113 is deenergized, permitting its armatures to fall. The falling of armature 157 will close the circuit through the blue light 173, while that to the yellow light will be broken by armature 152 an that to the red light by armature 146. The circuit through the green light 165 will remain closed, however, and there will be displayed in the cab two signals, the green and the blue, the blue being indicative, in conjunction with the green, that the train is in a block which must be traversed at a reduced rate of speed. The above constitutes the automatic cab signal system operated and controlled by the radio waves transmitted to the block from the antenna at the end of said block.

We will now describe the electrical connections whereby the speed of the train is reduced and controlled upon the receipt by the receiving set carried by the train of radio waves sent out respectively under "clear" "danger", "caution" and yard speed conditions heretofore described.

The high speed segment 103 is connected by wire 174 to upper contact point of armature 153, the pivot of which is connected by wire 175 with an upper contact point of the armature 158. The pivot of armature 158 is connected by wires 176, 177 and 178 to one end of the coil 94, the other end of said coil being connected by wire 179 and wire 180 to battery 181, the other side of battery 181 being connected by wires 182 and 183 to the pivot 102 of the speed indicator 100.

The "caution" segment 104 is connected by wire 184 to an upper contact point of armature 148, the pivot of which is connected by wire 185 with both the upper and lower contact points of armature 154, the pivot of which is connected by wire 186 to wire 175.

The "danger" segment 105 is connected by wire 187 to the wire 178.

The yard, sharp curve or twelve mile per hour speed segment 109 is connected by wire 188 to the upper contact point of armature 149 from which a wire 189 extends to an upper contact point of armature 155. The pivot of armature 149 is connected by wires 190 and 192 to the lower contact point 159' of armature 159. A wire 191 connects the pivot of armature 155 to wires 190 and 192 and in this manner the pivots of armatures 149 and 155 are connected to the lower contact point 159' of armature 159. The said segment 109 is also connected by wire 193 to the pivot of armature 161, the lower contact point of which is connected by wires 194 and 196 to the pivot of armature 151. The wire 195 and wire 196 also connect the pivot of armature 156 to the pivot of armature 151. The upper contact points of armatures 156 and 151 are connected by wire 197 from which a wire 198 runs to the switch 199 which is preferably mounted in the casing 200. This switch 199 may be of any well-known type adapted to be operated by the lever 201 connected to the throttle lever 74 by a link 202. This switch 199 is so arranged as to close the contacts 203 and 204 whenever the throttle is in a position to drive the train at or below yard or sharp curve speed which is preferably above twelve miles an hour. When the throttle is open to positions above said speed, the contact points 203 and 204 are opened by the throttle and the circuit therethrough is broken. Below said speed of twelve miles an hour, the contacts are closed by said throttle.

We will here further explain that within the casing 200 is a second switch 205 similar to switch 199 and also operated by the throttle 74 through the link 202 and the lever 201. In this switch 205 the contact points 206 and 207 are maintained closed so long as the throttle is in a position to drive the train at the slowest "danger" speed of said three miles per hour but are separated by the throttle to break the contact of said contact points 206 and 207 whenever the throttle is further opened to drive the train at higher speeds. The purpose and operation of the switches 199 and 205 controlled by the throttle 74 will be again referred to below.

Referring back to the switch 199, a wire 208 leads from the contact point 204 to wire 209 which is connected to one end of the coil 96, the other end of said coil being connected by wires 210 and 211 to wire 180 leading to battery 181. Leading from battery wire 182 is a wire 212 extending to the pivot of armature 160, the upper contact of which is connected by wire 213 with the pivot of armature 150, the upper contact of which is connected by wire 214 with the wire 209. The armature 93 of electromagnet 94 carries an insulated contact bridging member 215 adapted to bridge the contact points 216 and 217 when the magnet 94 is deenergized and to be lifted from said contact points when the said magnets are energized. Similarly, the armature 96 of electromagnet valve 97 is provided with a bridge contact member 218 adapted to bridge the contact points 219 and 220 when the magnet 97 is deenergized and to break the circuit therebetween when the said magnet is energized. From battery wire 182 extend wires 221 and 222 to contact point 216 and from wire 221 a wire 223 extends to contact point 219. From contact point 217 a wire 224 extends to one side of a recording mechanism 225 which is operative to automatically record on the dial or disc 226 any closing of the circuit through wire 224. From said mechanism a wire 227 runs back to wire 211 and wire 180 to battery 181. From contact point 220 a wire 228 runs to the other side of the recording mechanism 225 to actuate a mechanism operative to record on dial 229 any closure of the circuit through wire 228, said mechanism also being connected by wire 230 with wire 227 running back to the battery as just previously described.

In Fig. 5 is shown the positions in which the various parts are when the block is clear; the relay receiving sets 125, 126 and 127 are each receiving their respective radio waves and the relays 135, 139 and 143 thereof are operative to maintain their respective armatures in their highest positions. The speed indicator is indicated as being on the high speed segment and the throttle 74 is open. In these positions, the circuit through the electromagnet 94 will be held closed through the following circuit, namely, battery 181, wire 182, wire 183, indicator finger 101, segment plate 103, wire 174, armature 153, wire 175, armature 158, wires 176, 177 and 178, through the coil 94 to wire 179 and wire 180 back to battery 181. The circuit through the relay 97 will be held closed as follows,— battery 181, wire 182, wire 212, armature 160, wire 213, armature 150, wire 214, wire 209 to and through coil 97, thence by wire 210 and 211 to wire 180 and battery 181. Thus with a clear track the engineer may proceed at any speed that he may wish, because as the finger 101 sweeps over the various segments, the circuits therethrough are maintained closed. Thus, if the finger or pointer 101 were on segment 104, the circuit through the coil 97 would not be affected and the circuit through the coil 94 would be closed through wire 184, armature 148, wire 185, armature 154, wire 186 to wire 175, the circuit thereafter being the same as that described for segment 103. With the finger or pointer on plate 105, and the engineer proceeding at a slow speed, the circuit through the coil 94 would be closed to battery through plate 105, wire 187 and wire 178.

In Fig. 6 is a diagrammatic view of the relay magnets 135, 139 and 143 and the parts controlled thereby in the positions in which they are when the track signal system is in the "caution" position shown in Fig. 4. Under these conditions the relays 135 and 143 will be energized and their respective armatures elevated but the relay 139 will be deenergized and the armatures 152, 153, 154, 155 and 156 will be dropped.

When the track signals are set to "caution" and the engineer is driving the motor or locomotive at the predetermined "caution" speed, then the finger or indicator 101 will be on the "caution" segment 104. The circuit through the electromagnet coil 94 will be closed then as follows: battery 181, wire 182, wire 183 to finger 101, plate 104, wire 184, armature 148, wire 185, armature 154, wire 186 to wire 175, armature 158 and wires 176, 177, 178 to coil 94 and from coil 94 by wire 179 and wire 180 to battery 181. The circuit through the coil 97 will be closed by the following circuit: battery 181, wire 182, wire 212, armature 160, wire 213, armature 150, wires 214 and 209 to coil 97 and from coil 97 by wires 210, 211 and 180 back to battery 181 and the engineer may proceed under these conditions. If, however, he brings the train to a speed higher than the said predetermined "caution" speed, then the finger will move to the high speed segment 103 but the circuit therefrom through wire 174 will be broken by armature 153 and the circuit through the electromagnet 94 will be broken allowing the armature 93 to fall releasing the brakes and closing the throttle 74. In so falling, the bridge contact 215 will engage the contacts 216 and 217 and close the circuit through the left hand side of the recording mechanism 225 and will make a record of the fact that the magnet 94 has been deenergized and the brakes applied. As soon as the speed of the train has been reduced to "caution" speed and the finger or indicator 101 has reengaged the segment 104, then the circuit through the electromagnet 94 will be closed, the armature will be elevated and the brakes released and the engineer is at liberty to proceed at that "caution" speed.

In Fig. 7 is shown the position of the same parts when the signals of a track are in "danger" position and the relays 135, 139 and 143 are all deenergized. It will be plain that so long as the engineer keeps the train at the slow speed of say three miles an hour the indicator 101 will be on the "danger" plate 105, and the circuit from the battery through wire 182, wire 183, finger 101, plate 105, wire 187, wire 178, coil 94, wire 179, wire 180 back to battery 181 will remain closed. At three miles an hour, the switch 205 will be closed by the throttle as previously described the finger 101' will be on contact plate 107, and the circuit through the electromagnetic coil 97 will be closed through the following circuit: battery 181, wire 182, wire 183, arm or indicator 101', segment 107, wire 231, armature 147, wire 232 to switch 205 and thence by wire 233 to coil 97 and by wires 210, 211 and 180 back to battery 181. It is, of course, understood that the brush 108 carried by the pointer 101 engages the plate 107 when the train is moving at a speed of substantially three (3) miles per hour which position is fully illustrated in Fig. 7.

If, however, the engineer undertakes to proceed faster than three miles an hour and opens the throttle to do so, then the switch 105 will be opened and the circuit through the electromagnet valve 97 broken and the brakes applied and the throttle automatically closed. The falling of armature 96 together with the bridge contact 218 will close a circuit from battery 181 through wires 182, 221, 223, bridge 218, wire 228 to the recording mechanism for the right hand half of recorder 225 from which wires 230, 227, 211 and 180 lead back to battery.

In Fig. 8 is shown a view similar to Figs. 6 and 7, but showing the parts as they are disposed in a yard or sharp curve section wherein the engineer is moving at the twelve mile speed with the finger or indicator 101 in contact with the segment 109. Under these conditions, the speed of twelve (12) miles per hour throttle switch 199 will be closed and the speed of three (3) miles per hour throttle switch 205 will be open. The circuit through the relay coil 94 will be closed as follows: battery 181, wire 182, wire 183, contact finger 101, contact plate 109, wire 188, wire 189, armatures 155 and 149, wires 190 and 192, relay 159, wire 177, wire 178, coil 94, wire 179, and wire 180 back to battery. The circuit to coil 97 will be closed through the following circuit: battery 181, wire 182, wire 183, indicator 101, segment 109, wire 193, armature 161, wire 194, wires 195 and 196 through armatures 156 and 151 and wires 197 and 198 through switch 199 and wire 208 to wire 209 and relay 97 back through wires 210, 211 and 180 to battery 181. (See Fig. 8.) Should the engineer undertake to increase this speed, then the circuits will be broken through the switch 199. There is one other condition which is provided for in this mechanism. If by some accident or mischance the finger stuck on the "danger" plate 105 and the track signals were all clear, then the circuit through the segment plate 105 to the coil 94 would remain closed as would also the circuit through the coil 97, the circuits being thus shown in Fig. 5 and the engineer would be at liberty to run his train at any speed that he might desire. This is a desirable operation but if the track signals were set at "danger" under these conditions and the finger was on the "danger" segment 105, the circuits through the magnetic coils 94 and 97 would be maintained closed and the engineer could proceed at any speed he desired. To prevent this latter occurrence, the throttle control switch 205 comes into play, for if the throttle is open to a speed faster than three miles an hour, the circuit through the coil 97 will be broken in the switch 205 and the brakes will be applied. This feature is of particular importance when an engineer having brought the train to a low or slow speed of three miles an hour undertakes to increase the speed and the finger 101 sticks or refuses to move. Under these conditions, the engineer may proceed at the slow speed of three miles an hour and only at that speed so long as the track signals are in "danger" positions.

In Figs. 10 and 11 is illustrated a modified arrangement whereby the waves from the track or field signal system are transmitted to the track instead of to an antenna. This arrangement is shown in Fig. 10 which is exactly like Fig. 2 except that the wire 43 is connected through the armature 16 by a wire 42 directly to the track 1, the wire 51 being attached to the rail 2 as in the previously described constructions.

In Fig. 11 is shown the train equipment which is identical with that shown in Fig. 5 except that the wire 121 extends from the top of the coils 114, 115 and 116 to a barrel loop 234 in front of trucks 15. Said loop 234 is over and spaced from the rail 2 by six or eight inches. From the barrel loop 234 a wire 235 extends to another barrel loop 236 which is also in front of the truck 15 and is similarly over and spaced from the rail 1. Said barrel loop 236 is like the loop 234. From loop 236, a wire 237 leads back to the other ends of the coils 116, 115 and 114. From wire 121, a wire 238 leads to barrel loop 239 to the rear of the truck 15 and over the track 2 and from the loop 239 a wire 240 leads to another barrel loop 241 to the rear of the truck 15 and over the track 1. From the loop 241 a wire 242 leads back to wire 237. In this way the oscillations of the air waves or radio waves from the transmitting station are transmitted directly to the rails and are picked up by the barrel loops in front of the truck and are conveyed to the coils 114, 115 and 116. The loops in front of the trucks are the only two that are effective because it will be remembered the trucks shortcircuit the rails 1, 2 to the rear of the truck. The barrel loops, therefore, 239 and 241, in the rear of the trucks 15 are effective only when a train is running backwards over a stretch of track protected by block signals in which case the radio frequency impressed upon the rails by the radio transmitting station would induce similar oscillations in the barrel loops 239 and 241 and they in turn would be conducted to the radio receiver coils 114, 115 and 116 to operate the sets exactly as heretofore described.

It is to be understood that the invention above described may be readily applied to any train, locomotive or motor, and is not to be construed as limited to either steam or electrically operated trains unless so specifically stated in the appended claims. Many changes may be made in the specific features of construction above described without departing from the spirit or scope of our invention.

Having thus described our invention, what we claim and desire to protect by Letters Patent of the United States is:

1. In an automatic train speed controlling system, the combination of a track divided into insulated blocks, an automatic block system, a field radio transmitting station for each block, connected to the rails at the departure end of its block and operative to normally continuously simultaneously transmit radio waves of three different lengths, and means controlled by said block system to interrupt the transmission of certain of said radio waves.

2. In an automatic train speed controlling system, the combination of a track divided into insulated blocks, an automatic block signal system, a field radio transmitting station for each block, connected to the rails at the departure end of its block and operative to normally continuously simultaneously transmit radio waves of three different lengths, and means controlled by said signal system to interrupt the transmission of certain of said radio waves, whenever said signal is in "danger" position.

3. In an automatic train speed controlling system, the combination of a track divided into insulated blocks, an automatic block signal system, a field radio transmitting station for each block, connected to the rails at the departure end of its block and operative to normally continuously simultaneously transmit radio waves of three different lengths, and means controlled by said signal system to interrupt the transmission of certain of said radio waves from said transmitter when said signal is set to caution and to interrupt the transmission of certain other of said radio waves whenever said signal is in "danger" position.

4. In an automatic train speed controlling system, the combination of a track divided into insulated blocks, an automatic block signal system, a field radio transmitting station for each block, connected to the rails at the departure end of its block and operative to normally continuously simultaneously transmit radio waves of three different lengths, and means controlled by said signal system to interrupt the transmission of all of said radio waves whenever said signal is in "danger" position.

5. In an automatic train speed controlling system, the combination of a track divided into insulated blocks, an automatic block signal system, a field radio transmitting station for each block, connected to the rails at the departure end of its block and operative to normally continuously simultaneously transmit radio waves of three different lengths, a high tension alternating current power transmission line, a step down transformer to supply current from said power line to said radio transmitting station, and means controlled by said signal to stop the transmission of radio waves of one of the three wave lengths when the said signal is in "caution" position and to completely stop the transmission of any radio waves when said signal is in "danger" position.

6. In an automatic train speed controlling system, the combination with a track divided into insulated blocks, and a field equipment comprising a radio transmitting station for each block, each station having a plurality of radio transmitters normally operative to normally and continuously simultaneously transmit from said station radio waves of three distinct and different lengths, said transmitters of a station being connected to the departure end of its block, of a train equipment, comprising as many radio receiving sets as there are transmitting sets in the field transmitting station, each set being tuned to one of the wave lengths of said transmitting station, and an automatic brake mechanism, said receiving sets being operative to hold said brake applying mechanism inoperative so long as all the receiving sets are receiving waves from the transmitting station of the block in which the train may be and operative to release said brake mechanism to apply the brake when one or more of said receiving sets is not receiving waves from said transmitting station.

7. In an automatic train speed controlling system, the combination with a field equipment comprising an automatic block signal system, a track divided into insulated blocks, a radio transmitting station operative to normally continuously simultaneously transmit radio waves of three different lengths and means controlled by said signal system to automatically interrupt the transmission of one or more of said radio waves to correspond to track conditions, of a train equipment comprising three radio receiving sets each respectively tuned to correspond to one of the wave lengths sent out from said transmitting station, a brake applying mechanism, and means controlled by said radio receiving sets to hold said brake applying mechanism inoperative so long as all three receiving sets are operating to receive the radio waves from the field transmitting station of the block in which the train may be and operative to actuate said brake applying mechanism to hold the speed of the train to the speed indicated by the position of said signal.

8. In an automatic train speed controlling system, the combination with a field equipment comprising an automatic block signal system, a track divided into insulated blocks, a radio transmitting station having a plurality of radio transmitters normally operative to continuously and simultaneously transmit from said station radio waves of as many and distinct and different lengths as there are transmitters, each transmitter being grounded to the rails at the departure end of its block, and means controlled by said signal system to automatically interrupt the operation of one or more of said transmitters to correspond to track conditions, of a train equipment comprising an automatic brake applying mechanism, as many radio receiving sets as there are transmitters in said transmitting station, each receiving set being respectively tuned to correspond to one of the radio waves sent out by said transmitting station, and means controlled by said radio receiving sets to hold said brake applying mechanism inoperative so long as all of the receiving sets are receiving waves from the transmitting station and operative to actuate the brake applying mechanism to reduce the speed of the train to that corresponding to track conditions as indicated by the cessation of the receipt of radio waves by one or more of the receiving sets.

9. In an automatic train speed controlling system, the combination with a track divided into insulated blocks, and a radio transmitter for each block, grounded to the departure end thereof and adapted to normally continuously and simultaneously send out radio waves of three different lengths, of a train equipment comprising a radio receiving apparatus grounded to the track, an automatic brake applying mechanism, and means held in one position by said receiving apparatus to hold said brake applying mechanism inoperative so long as said receiving apparatus is responding to all of the different sets of waves sent out from said transmitter.

10. In an automatic train speed controlling system, the combination with a track divided into insulated blocks, and a radio transmitter for each block, grounded to the departure end thereof and adapted to normally continuously and simultaneously send out radio waves of three different lengths, of a train equipment comprising a radio receiving apparatus grounded to the track, an automatic brake applying mechanism, and means held in one position by said receiving apparatus to hold said brake applying mechanism inoperative so long as said receiving apparatus is responding to all of the different sets of waves sent out from said transmitter and moved in a second position by said receiving apparatus when the receipt of certain of said radio waves by said receiving apparatus is interrupted, to actuate said brake applying mechanisms to reduce the speed of the train.

11. In on automatic train speed controlling system, the combination with a track divided into insulated blocks, and a radio transmitter for each block, grounded to the departure end thereof and adapted to normally continuously and simultaneously send out radio waves of three different lengths, of a train equipment comprising a radio receiving apparatus grounded to the track, an automatic brake applying mechanism, and means held in one position by said receiving apparatus to hold said brake applying mechanism inoperative so long as said receiving apparatus is responding to all of the different sets of waves sent out from said transmitter and moved to another position by said receiving apparatus when the receipt of radio waves of all three lengths is interrupted to automatically substantially stop said train.

12. In an automatic train speed controlling system, the combination with a track divided into insulated blocks, and a radio transmitter for each block, grounded to the departure end thereof and adapted to normally continuously and simultaneously send out radio waves of three different lengths, of a train equipment comprising a radio receiving apparatus grounded to the track, an automatic brake applying mechanism, means held in one position by said receiving apparatus to hold said brake applying mechanism inoperative so long as said receiving apparatus is responding to all of the different sets of waves sent out from said transmitter and moved to another position by said receiving apparatus when the receipt of radio waves of all three lengths is interrupted to automatically substantially stop said train, and means to permit the train to be propelled at a very slow speed when said radio receiving sets are not receiving waves from the radio transmitter connected to the block.

13. In an automatic train speed controlling system, the combination with a field equipment comprising a radio transmitting apparatus normally operative to send out continuously and simultaneously three distinct lengths of radio waves, of a train equipment comprising three radio receiving sets, each respectively tuned to respond to one of said waves, a brake applying mechanism, and means in the plate circuits of said radio receiving sets to hold said brake applying mechanism inoperative so long as all of said sets are receiving radio waves from said transmitter and to actuate said brake applying mechanism to hold the train to predetermined speeds when the receipt of radio waves by one, two or all of said radio receivers is interrupted.

14. In an automatic train speed controlling system, the combination of a track divided into insulated blocks, an automatic block system, a plurality of radio transmitting stations, one for each block, grounded to the rails at the departure end of its block and operative to normally continuously and simultaneously broadcast through the air radio waves of a plurality of different lengths, and means controlled by said block system to interrupt the transmission of the broadcasting of certain of said radio waves.

15. In an automatic train controlling system, the combination with a track divided into insulated blocks, and a block signal system connected thereto, of an automatic block signal for each block, a radio transmitter for each block, grounded to the track at the departure end of its block and adapted to normally continuously and simultaneously broadcast radio waves of a plurality of different lengths, a train equipment comprising a radio receiving apparatus including as many receiving sets as there are different lengths of waves sent out from said transmitter, each receiving set being arranged to respond only to one set of waves transmitted thereto from the transmitting station of the block in which the train may be, an automatic brake applying mechanism, and means actuated by said receiving sets to hold said brake applying mechanism inoperative so long as all said receiving sets respond to the waves sent out by said transmitter, and to automatically actuate said brake applying mechanism to reduce the speed of the train to correspond to the signal of the block in which the train may be when certain of said receiving sets are not receiving waves of the length to which they are attuned.

16. In an automatic train signaling system, the combination with a field equipment comprising a track divided into insulated blocks, a block signal system, a radio transmitting station communicating with the departure end of each block and arranged to normally continuously simultaneously transmit radio carrier waves of three distinct and different lengths, and means controlled by the block signal of a block to interrupt the transmission from said transmitter of said block of waves of certain length when said signal is set to "caution" position of a train equipment comprising a plurality of radio receiving sets, each grounded to the track and each respectively tuned to respond only to waves of one length sent out from said transmitting station, a cab signal system comprising a "clear" cab signal and a "caution" cab signal and means actuated by the receiving sets to display said "clear" cab signal when all said receiving sets are simultaneously responding to waves sent out from said transmitting station and to display said "caution" cab signal so long as said field block signal interrupts the transmission of waves of a particular length and to which one of the receiving sets is attuned.

17. In an automatic train signaling system, the combination with a field equipment comprising a track divided into insulated blocks, a block signal system, a radio transmitting station communicating with the departure end of each block and arranged to normally continuously simultaneously transmit radio carrier waves of three distinct and different lengths, and means controlled by the block signal of a block to interrupt the transmission from said transmitter of said block of waves of all lengths when said signal is set to "danger", of a train equipment comprising a plurality of radio receiving sets, each grounded to the track and each respectively tuned to respond to waves of only one length sent out from said transmitting station, a cab signal system comprising a "clear" cab signal and a "danger" cab signal, and means actuated by the receiving sets to display said "clear" cab signal when all said receiving sets are simultaneously responding to their respective wave lengths sent out from said transmitting station and to display said "danger" cab signal when the transmission of all waves from said transmitting station is interrupted, and the reception of waves by all of said receiving sets is consequently interrupted.

18. In an automatic train signalling system, the combination with a field equipment, a block signal system, a radio transmitting station arranged to normally continuously simultaneously transmit radio waves of three distinct and different lengths, and means controlled by a block signal to interrupt the transmission from said transmitting station of waves of certain lengths when said signal is set to "caution"; interrupt the transmission of waves of all lengths from said transmitting station when said signal is set to "danger", of a train equipment comprising a plurality of radio receiving sets, each respectively tuned to respond to but one of the wave lengths sent out from said transmitting system, a cab signal system comprising a "clear" cab signal, a "caution" cab signal and a "danger" cab signal, and means controlled by said receiving sets to display said "clear" cab signal when all of said receiving sets are simultaneously responding to waves sent out from said transmitting station; to display said "caution" cab signal when certain of said wave lengths are not being transmitted from said transmitting station, and to display said "danger" signal when no radio waves are being transmitted from said transmitting station.

19. In an automatic train signaling system, the combination with a field equipment comprising a track divided into insulated blocks, a radio transmitting station communicating with the departure end of each block and arranged to normally continuously simultaneously transmit waves of three distinct and different lengths, and means to interrupt the transmission from said transmitter of waves of certain lengths when the block in which the train may be should be traversed at "caution" speed; to interrupt the transmission of waves of other lengths therefrom when said block should be traversed at "yard" speeds; and to interrupt the transmission of all waves therefrom when said block should be traversed at "danger" speeds, of a train equipment comprising a plurality of radio receiving sets each respectively tuned to respond to but one of the wave lengths sent out from said transmitting station, a cab signaling system comprising a "clear" cab signal, a "caution" cab signal, "yard" speed signal and a "danger" cab signal, and means controlled by said radio receiving sets for displaying said "clear" cab signal when all said receiving sets are simultaneously responding to waves transmitted from said transmitting station; to display said "caution" cab signal when said track is to be traversed at "caution" speeds and the transmission of waves of certain length is interrupted at said transmitting station, and to display said "danger" signal when said block should be traversed at "danger" speeds and none of said receiving sets are receiving waves to which they are respectively attuned.

20. In an automatic train speed controlling system, the combination of a track divided into insulated blocks, an automatic block system, a field radio transmitting station for each block grounded to the rails of the block at the departure end thereof and operative to normally continuously simultaneously broadcast through the air radio waves of a plurality of different lengths, and means controlled by the block system to interrupt the transmission of certain of said radio waves whenever the block is in "danger" condition.

21. In an automatic train speed controlling system, the combination of a track divided into insulated blocks, an automatic block system, a field radio transmitting station for each block grounded to the rails of the block at the departure end thereof and operative to normally continuously simultaneously broadcast radio waves of a plurality of different lengths, and means controlled by said block system to interrupt the transmission of certain of said radio waves from said transmitter when the block is in "caution" condition and to interrupt the transmission of certain of other of said radio waves whenever said block is in "danger" condition.

22. In an automatic train speed controlling system, the combination of a track divided into insulated blocks, an automatic block system, a field radio transmitting station for each block connected to the rails of the block at the departure end thereof and operative to normally continuously simultaneously transmit radio waves of a plurality of different lengths, each transmitting station broadcasting a like plurality of radio waves, means controlled by said block system to interrupt the transmission of all of said radio waves whenever the block in which the train may be is in "danger" condition and a plurality of radio receiving sets each tuned to one of the transmitters of a block respectively and grounded to the rail whereby said receiving sets respond only to the transmitters of the block in which the train may be.

23. In an automatic train speed controlling system, the combination with a track divided into insulated blocks and a radio transmitter for each block grounded to the departure end of its block and adapted to normally continuously simultaneously broadcast radio waves of a plurality of different lengths, of a train equipment comprising a radio receiving apparatus grounded to the track, automatic brake applying mechanism, and means held in one position by said receiving apparatus to hold the brake applying mechanism inoperative so long as said transmitting apparatus of the block in which the train may be is broadcasting all of its different lengths of waves and moved to a second position by said receiving apparatus when the broadcasting of certain of said radio waves of said transmitting apparatus of the block in which the train may be is interrupted to actuate said brake applying mechanism.

24. In an automatic train speed controlling system, the combination with a track divided into insulated blocks and a radio transmitter for each block, grounded to its block and adapted to normally continuously and simultaneously broadcast radio waves of a plurality of different lengths, each station broadcasting radio waves of the same length as those broadcasted by the other transmitter stations, of a train and a train equipment therefor comprising a plurality of radio wave receiving circuits, each tuned respectively to one wave length of said transmitter stations, means to cause each tuned circuit to respond to the waves of the length to which it is tuned and broadcasted from the transmitter stations of the block in which the train may be, an automatic brake applying mechanism, means controlled by said circuit to hold said brake applying mechanism inoperative to apply the brakes so long as all of said circuits are responding to radio waves from the transmitting station of the block in which the train may be, and means to control each receiving circuit so that it responds only to the radio waves of the length for which it is tuned and which are transmitted from the transmitter station of the block in which the train may be by grounding each transmitter to the rails of its block.

25. In an automatic train speed controlling system, the combination with a track, the rails of which are divided into insulated blocks, of an automatic block signal system, an oscillatory transmitter for each block electrically connected to a rail of said track at the departure end of the block and the operation of which is controlled by said block signal system, said transmitter being operative to simultaneously transmit a plurality of waves tuned to different frequencies, and means actuated by the train block signal system to stop the transmission of waves of one frequency when the track condition is "caution" and to stop the transmission of waves of all frequencies when the track condition is "danger".

In witness whereof, we have hereunto set our hands this first day of April, 1925.

FRANK C. WILLIAMS.
GEORGE H. WILLIAMS.